United States Patent [19]

Meckstroth

[11] Patent Number: 5,700,212
[45] Date of Patent: Dec. 23, 1997

[54] SYSTEM FOR POWERING ROTATING ACCESSORIES OF AN INTERNAL COMBUSTION ENGINE

[75] Inventor: Richard J. Meckstroth, Northville, Mich.

[73] Assignee: Ford Global Technologies, Inc., Dearborn, Mich.

[21] Appl. No.: 657,072

[22] Filed: Jun. 3, 1996

[51] Int. Cl.$^6$ .............................. F16H 9/00; F16H 59/00; F16H 61/00
[52] U.S. Cl. ................................. 474/70; 474/69
[58] Field of Search ................... 474/69, 70, 71; 192/31, 41 R, 200, 201

[56] References Cited

U.S. PATENT DOCUMENTS

| 3,747,731 | 7/1973 | Smirl . |
| 4,020,711 | 5/1977 | Woollard . |
| 4,080,843 | 3/1978 | Underwood . |
| 4,265,135 | 5/1981 | Smirl . |
| 4,296,717 | 10/1981 | Schlagmuller . |
| 4,502,345 | 3/1985 | Butterfield . |
| 4,667,537 | 5/1987 | Sivalingham . |
| 4,706,520 | 11/1987 | Sivalingam . |
| 4,846,768 | 7/1989 | Kitami et al. . |
| 4,854,192 | 8/1989 | Churchill et al. ............. 74/752 |
| 4,854,921 | 8/1989 | Kumm . |
| 4,878,401 | 11/1989 | Chung . |
| 4,969,857 | 11/1990 | Kumm . |
| 5,076,216 | 12/1991 | Ro . |

FOREIGN PATENT DOCUMENTS 2 486 610   1/1982   France .

OTHER PUBLICATIONS

"Accessory Drive Has Two Speeds" Automotive Engineering, 1984.

Primary Examiner—Tamara L. Graysay
Assistant Examiner—Gary S. Hartmann
Attorney, Agent, or Firm—Neil P. Ferraro

[57] ABSTRACT

A system for powering various rotating vehicle accessories such as an alternator, a power steering pump, and an air-conditioning compressor from both a water pump and an engine's crankshaft. At relatively low engine crankshaft speeds, the accessories are driven by a clutch mounted on a water pump at a first speed ratio relative to the engine crankshaft speed; at relatively high engine crankshaft speeds, the accessories are driven by the crankshaft at a second speed ratio relative to the engine crankshaft speed.

11 Claims, 3 Drawing Sheets

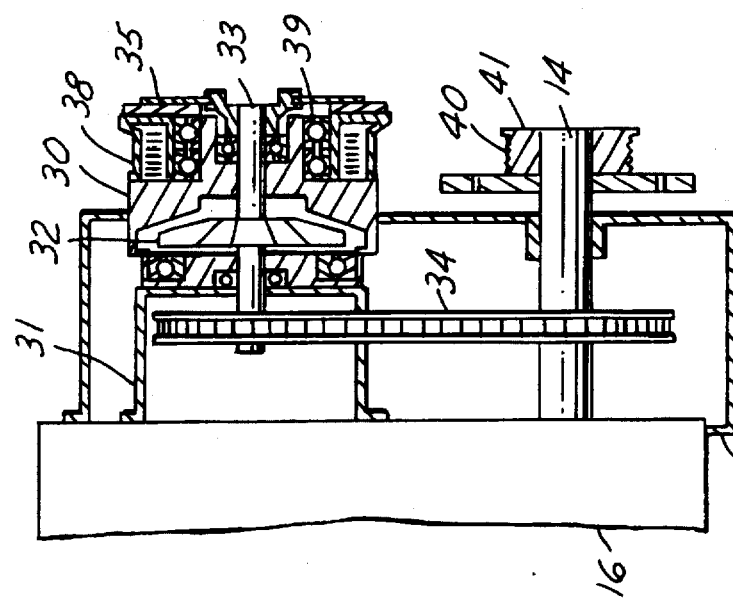
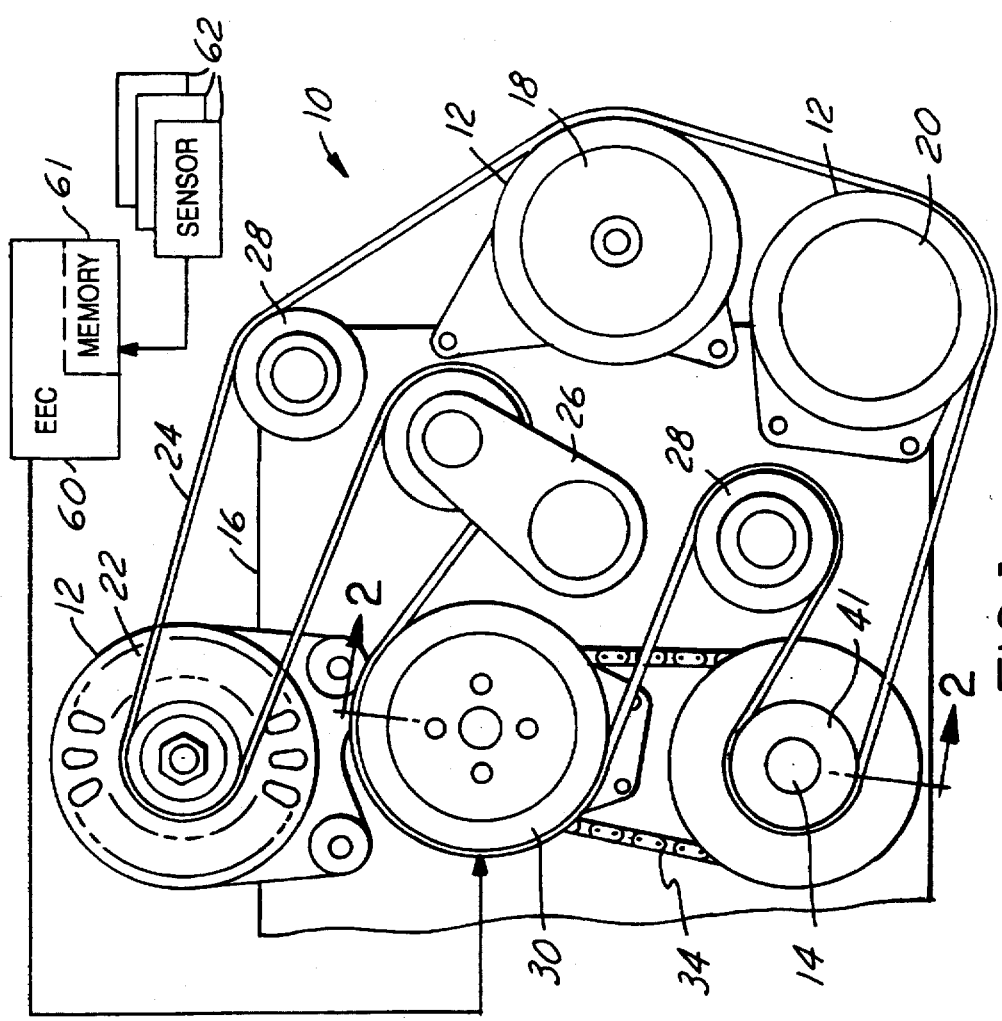

SYSTEM FOR POWERING ROTATING ACCESSORIES OF AN INTERNAL COMBUSTION ENGINE

FIELD OF THE INVENTION

The present invention relates to a system for powering rotating accessories, and more particularly to, a speed changing accessory drive system.

BACKGROUND OF THE INVENTION

Internal combustion engines typically drive several accessories through a belt arrangement powered by the engine's crankshaft or camshaft. Such accessories may generally include an air conditioning compressor, a power steering pump and an alternator, for example. A well recognized problem with conventional belt driven systems is that the accessories' rate of rotation is proportional to engine speed. The design of such accessories has thereby been compromised in order to ensure both adequate performance at low engine speeds and dependability and longevity at high engine speeds. To solve this problem, as well as to attain other benefits including increased fuel economy, and reduced weight, noise, and vibration, it has been proposed to operate the accessories at a changeable drive ratio instead of a fixed drive ratio, whereby the accessories are driven relatively faster at low engine speeds (such as idle speed) and relatively slower at high engine speeds (such as cruising speed).

These various speed changing devices are mounted to the front end of the engine's crankshaft and have been developed in both a continuously variable speed ratio and a discrete shift between two ratios. However, none of these prior art devices have proven to be practical from the standpoint of smoothness, space limitation, cost, or durability.

SUMMARY OF THE INVENTION

An object of the present invention is to provide an accessory drive system such that at relatively low engine speeds, the accessories are driven by a drive unit at a first speed ratio and, at relatively high engine speeds, the accessories are driven by the crankshaft at a second speed ratio.

This object is achieved and disadvantages of prior art approaches overcome, by providing a novel system for powering rotating accessories from a rotating shaft on an internal combustion engine. In one particular aspect of the invention, the system includes a drive unit rotatably connected to the rotating shaft and a drive unit clutch mounted to said drive unit. An overrunning clutch is mounted directly to the rotating shaft. A plurality of rotating accessories is rotatably connected to the drive unit through the drive unit clutch and rotatably connected to the rotating shaft through the overrunning clutch. During a first speed ratio, the accessories are driven by the drive unit. During a second speed ratio the accessories at are driven directly by said rotating shaft. The drive unit clutch operates at a predetermined threshold value of an engine operating condition thereby defining the transition between the first and second speed ratios.

The system may also be controlled by a controller. The controller causes the drive unit clutch to operate at the predetermined threshold value.

The above object is also achieved and disadvantages of prior art approaches also overcome by providing a novel accessory drive system for powering rotating accessories from a rotating crankshaft on an internal combustion engine. The accessory drive system includes a water pump rotatably connected to the rotating crankshaft for pumping coolant through the engine. A plurality of rotating accessories is rotatably connected to the crankshaft through the water pump and rotatably connected directly to the crankshaft. During a first range of engine crankshaft speeds, the accessories are driven through the water pump. During a second range of engine crankshaft speeds, the accessories are driven directly by the crankshaft. The water pump has a clutch for selectively supplying power to the accessories.

An advantage of the present invention is that lower engine idle speed can be achieved by over-speeding the accessories.

Another advantage of the present invention is that a smooth shift between the two speed ratios is accomplished.

Yet another advantage of the present invention is that the water pump used to at least partially drive the accessories is always operated at a constant speed ratio relative to the engine crankshaft speed.

Still another advantage of the present invention is that the accessories can operate at the lower speed ratio during a system fault.

Still another advantage of the present invention is that high hub loads associated with mounting a drive pulley on the water pump may be accommodated.

Other objects, features and advantages of the present invention will be readily appreciated by the reader of this specification.

BRIEF DESCRIPTION OF THE DRAWINGS

The invention will now be described, by way of example, with reference to the accompany drawings, in which:

FIG. 1 is a diagrammatic front view of a system according to the present invention;

FIG. 2 is a diagrammatic side view of a system according to the present invention;

DETAILED DESCRIPTION OF THE PREFERRED EMBODIMENTS

Figure 3:
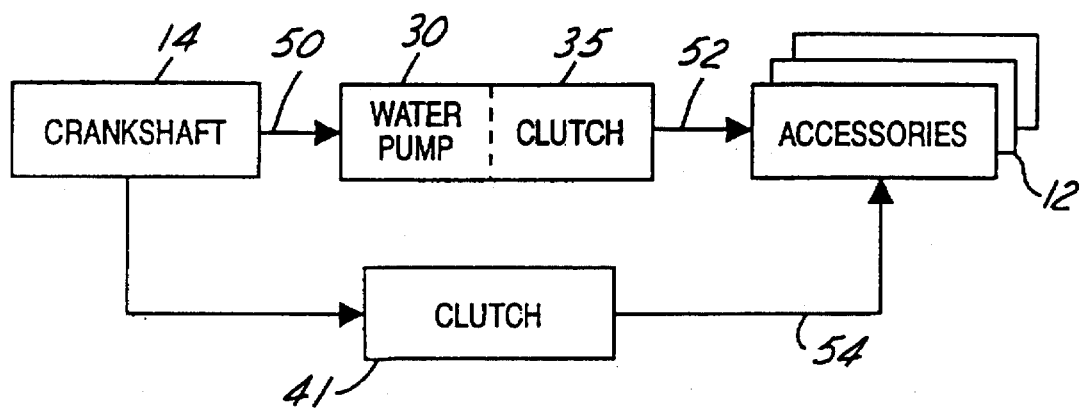
FIG. 3 is a schematic illustration of a system according to the present invention.

Accessory drive system 10, shown in FIGS. 1 and 2, is used to vary the operating speed of accessories 12 of internal combustion engine 16. Accessories 12 typically include air conditioning compressor 18, power steering pump 20, and alternator 22. Belt 24 is trained around the various accessories 12 to supply power from crankshaft 14 to accessories 12, as will become apparent hereinafter. As is well known to those skilled in the art, tensioner 26 may be provided to apply tension to belt 24. In addition idlers 28 are used to guide belt 24 throughout its course. Water pump 30, mounted to engine 16 by bracket 31, pumps coolant throughout engine 16. Accordingly, water pump 30 includes an inlet, an outlet and impeller 32 mounted on shaft 33, which, in turn, is connected to crankshaft 14 through chain 34. As shaft 33 rotates, coolant is pumped throughout engine 16. For the sake of clarity, cover 37, which is used to house chain 34, is not shown in FIG. 1.

According to the present invention, water pump 30 is also used as a drive unit to power accessories 12 at least for a portion of the range of engine crankshaft speeds. Thus, water pump 30 includes clutch 35 mounted to shaft 33. When clutch 35 is engaged, power is transmitted to accessories 12 from crankshaft 14 through shaft 33 of water pump 30 to drive pulley 38, which is mounted on double bearing 39. Bearing 39 is sufficient to accommodate the relatively high hub loads associated with drive pulley 38. Pulley 40 is mounted to overrunning clutch 41, which, in turn, is mounted on crankshaft 14. Overrunning clutch 41 allows pulley 40 to rotate faster than crankshaft 14. Thus, when accessories 12 are powered by water pump 30, no power is transmitted from crankshaft 14 to accessories 12 directly. When clutch 35 of water pump 30 is disengaged, power from crankshaft 14 is transmitted through overrunning clutch 41 to power accessories 12 while pulley 38 rotates freely. Those skilled in the art will recognize in view of this disclosure that any rotating shaft, such as crankshaft 14, a camshaft (not shown) or a dedicated accessory drive shaft (not shown) may be used to power both water pump 30 and accessories 12 according to the present invention.

As is well known to those skilled in the art, the speed ratio of each individual accessory is predetermined based on the diameters of the drive and driven pulleys. In prior art systems having no speed changing capabilities, this speed ratio (ratio of accessory speed to engine crankshaft speed) is a compromise to ensure both adequate performance at low engine speeds and dependability and longevity at high engine speeds. This prior art speed ratio is labeled "Fixed Speed Ratio" in the following table. According to the present invention, water pump 30 continuously rotates at a speed ratio of 1.2:1 relative to engine crankshaft speed based on chain 34 and the associated sprocket wheels (not shown). Further, according to the present invention, because water pump 30 powers accessories 12 during relatively low engine speeds, and the crankshaft 14 directly powers accessories 12 during relatively high engine speeds, the "Fixed Speed Ratio" is altered. That is, the "Fixed Speed Ratio" is multiplied by an "Accessory Drive Speed Factor". When water pump 30 acts as the accessory drive, accessories 12 are over-sped because, in this case, the "Accessory Drive Speed Factor" is 1.2, which is the same as the water pump speed ratio. This is shown under the column heading "Low Engine Speed Ratio". When overrunning clutch 41 acts as the accessory drive, accessories 12 are reduced in speed, when compared to the prior art "Fixed Speed Ratio", because, in this case, the "Accessory Drive Speed Factor" is 0.5. This is shown under the column heading "High Engine Speed Ratio". Thus, at relatively low engine speeds, accessories 12 rotate at a relatively faster speed (for example, by engaging clutch 35, thereby powering accessories 12 through water pump 30), and at relatively high engine speeds, accessories 12 rotate at relatively slower speed (for example, by disengaging clutch 35 thereby powering accessories directly from crankshaft 14).

| Accessory | Fixed Speed Ratio | Low Engine Speed Ratio | High Engine Speed Ratio |
| --- | --- | --- | --- |
| Water Pump | 1.2:1 | 1.2:1 | 1.2:1 |
| Alternator | 2.7:1 | 2.7 × 1.2 = 3.24:1 | 2.7 × .5 = 1.35:1 |
| Power Steering Pump | 1.26:1 | 1.26 × 1.2 = 1.51:1 | 1.26 × .5 = .63:1 |
| Air Conditioning Compressor | 1.37:1 | 1.37 × 1.2 = 1.64:1 | 1.37 × .5 = .69:1 |

Of course, those skilled in the art will recognize in view of this disclosure that the specific speed ratios described above may be modified depending upon pulley and sprocket diameters. According to the present invention, however, as can be seen from the table above, it is desirable to operate accessories 12 2.4 times faster at low engine speeds than at high engine speeds. Thus the ratio of "Low Engine Speed Ratio" to "High Engine Speed Ratio" is about 2.4:1.

Alternatively, rather than operating (overspeeding) accessories 12 of the present invention at a 20% greater speed (during low engine speeds, such as idle speed) than the "Fixed Speed Ratio" of prior art systems, engine idle speed may be reduced by 20%. Of course, this has the attendant benefit of increased fuel economy and durability of accessories 12.

The system according to the present invention is shown schematically in FIG. 3. When clutch 35 is engaged, power from crankshaft 14 is supplied first to water pump 30 through path 50, then to accessories 12 through path 52. When clutch 35 is disengaged, power from overrunning clutch 41, which is mounted to crankshaft 14, is supplied directly to accessories 12 through path 54. Thus, according to the present invention, the arrangement of FIG. 3 shows accessories 12 rotatably connected to crankshaft 14 through water pump 30 in series arrangement with water pump 30. The arrangement also shows accessories 12 rotatably connected directly to crankshaft 14 in parallel arrangement with water pump 30. As can be seen by path 54 in FIG. 3, should water pump 30 or clutch 35 fail, a power path to accessories 12 still exists, namely through overrunning clutch 41 mounted to crankshaft 14, albeit at relatively slower speeds in this example.

Figure 4:
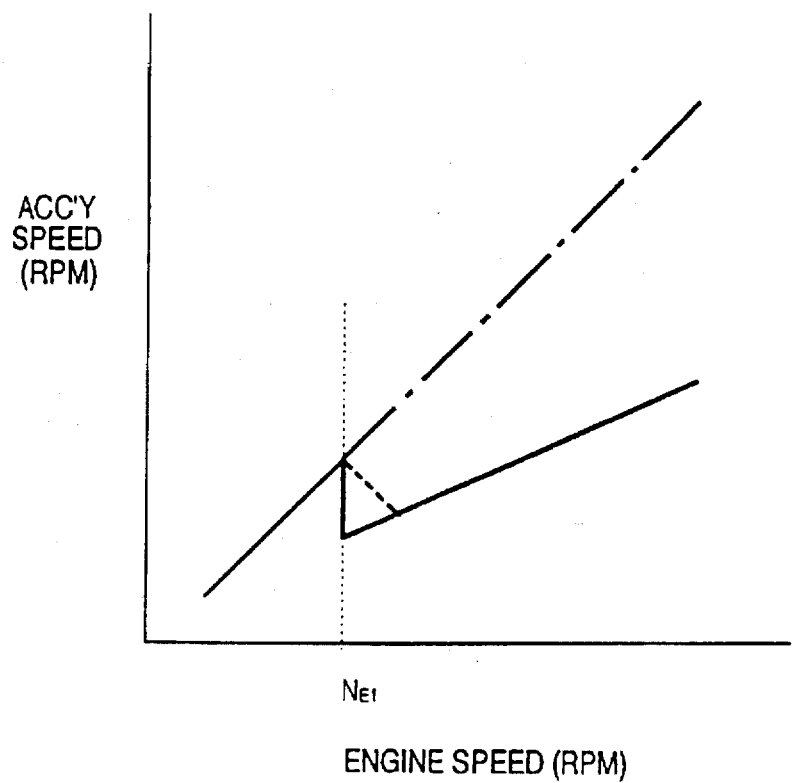
FIG. 4 is a diagram showing engine speed versus accessory speed according to the present invention; and, FIG. 5 is control flow chart according to the present invention.

FIG. 4 shows a graph representing engine speed versus accessory speed. Initially at relatively low engine crankshaft speeds, accessories 12 are driven by water pump 30 at the "Low Engine Speed Ratio", shown by the solid line. At the switch point $N_{E1}$, clutch 35 disengages. Thus, accessories 12 are now driven directly by crankshaft 14 through overrunning clutch 41 at the "High Engine Speed Ratio". As shown by the dot-dash line, the speed ratio of water pump 30 remains constant at all engine speeds as described above.

To provide a smooth transition between the two speed ratios, disengagement of clutch 35 may extend over a period of time. In this example, the disengagement period is about 3 seconds. As such, as shown in FIG. 4 by the dotted line, clutch 35 may be allowed to slip to provide a smooth transition between the two operating speed ratios. Of course, those skilled in the art will recognize in view of this disclosure that the dotted line shown in FIG. 4 may have a variable rate with smooth boundary conditions to provide even a smoother transition between speed ratios.

In the example described herein, clutch 35 is normally disengaged when engine 16 is not running. However, because it may be undesirable to immediately engage clutch 35 on engine start, engagement of clutch 35 occurs only after a predetermined time period has elapsed. As indicated above with respect to disengaging clutch 35, it may also be desirable to extend the engagement over a period of time, also lasting about 3 seconds.

Figure 5:
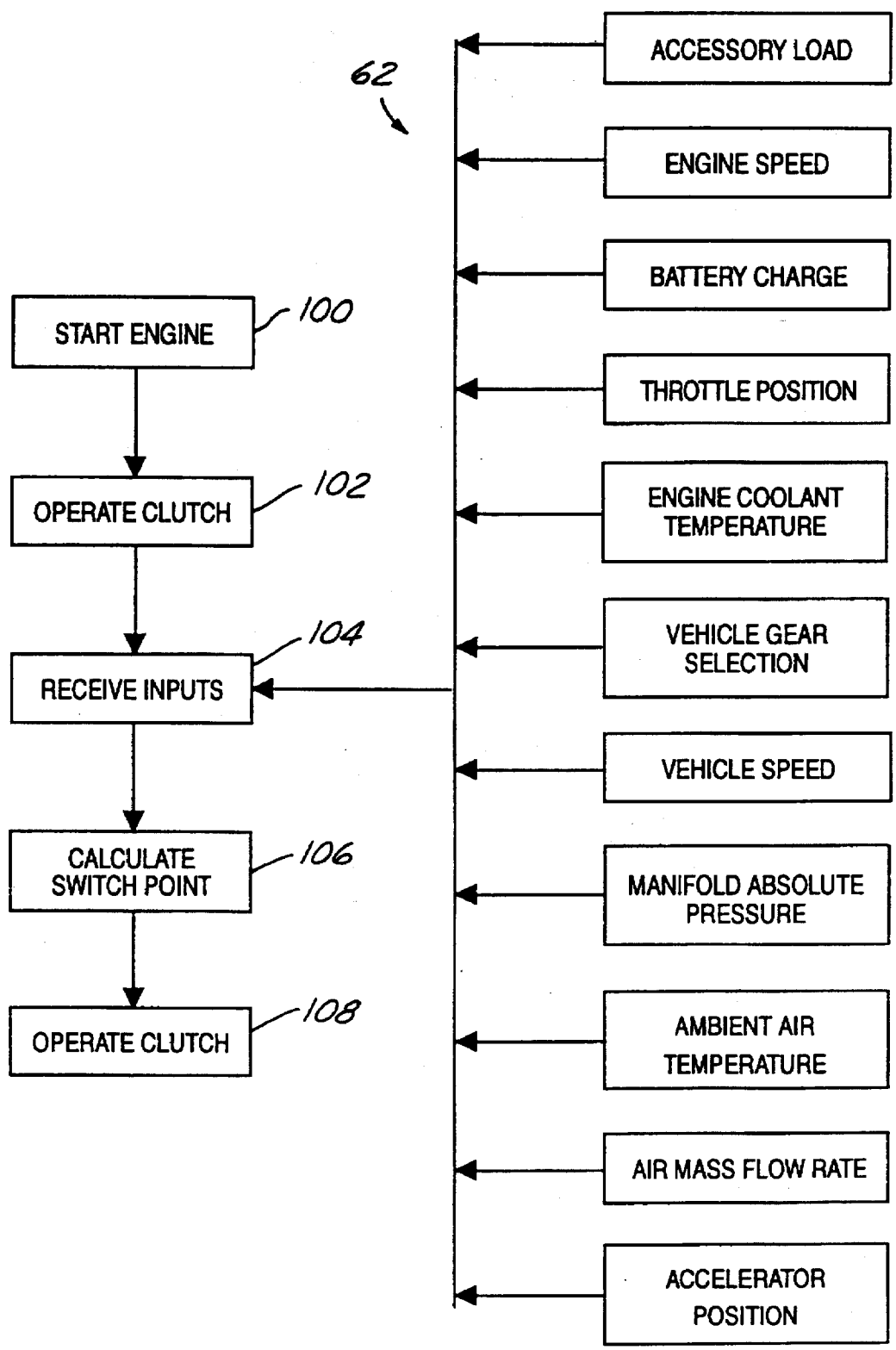

Referring now to FIGS. 1 and 5, system 10 according to the present invention may be controlled by electronic engine controller 60 having memory 61. For example, the point at which the transition between powering accessories 12 through water pump 30 to powering accessories 12 directly from crankshaft 14 is controlled by electronic engine controller 60. Controller 60 receives inputs from a plurality of sensors 62, processes the information received and transmits a signal to clutch 35 to engage or disengage accordingly.

Thus, according to the present invention, the point (shown at $N_{E1}$ in FIG. 4) at which the accessory speed ratio is changed between the "Low Engine Speed Ratio" to the "High Engine Speed Ratio" may be varied depending upon operating conditions. FIG. 5 illustrates this. At step 100, engine 16 is started. At step 102, clutch 35 is operated, for example, by engaging clutch 35 such that accessories 12 are driven by water pump 30. At step 104, controller 60 receives inputs from sensors 62, which include many of the types of sensors known to those skilled in the art of engine control and suggested by this disclosure. Accordingly, sensors 62 may sense such conditions as accessory load, engine speed, battery charge, throttle position, engine coolant temperature, vehicle gear selection, vehicle speed, intake manifold absolute pressure, ambient air temperature, intake manifold air mass flow rate, accelerator position, and other operating conditions known to those skilled in the art and suggested by this disclosure. Controller 60 then compares the sensed operating conditions with predetermined threshold values. Thus, at step 106, controller 60 calculates the point at which accessories 12 are driven by crankshaft 14 rather than through water pump 30. Based on this calculation, at step 108, controller 60 signals clutch 35 to disengage, for example, such that accessories 12 are powered directly by crankshaft 14.

In a preferred embodiment, clutch 35 may be an electromagnetic clutch. The electromagnetic clutch controls torque distribution from shaft 33 to drive pulley 38. The electromagnetic clutch includes a fixed coil winding and a core that establishes an electromagnetic flux flow path through a clutch friction member. A clutch engagement plate is disposed adjacent the friction member and attached to shaft 33. Thus, when an electrical current is applied to the windings, the clutch engagement plate is magnetically attracted to the friction member. Rotating power may now be transmitted from shaft 33 to pulley 38. Alternatively, clutch 35 may be a typical band clutch known to those skilled in the art and suggested by this disclosure.

While the best mode in carrying out present invention has been described in detail, those familiar with the art to which this invention relates will recognize various alternative designs and embodiments, including those mentioned above, in practicing the invention as defined by the following claims.

I claim:

1. A system for powering rotating accessories from a rotating shaft on an internal combustion engine, the system comprising:

a drive unit rotatably connected to said rotating shaft;

a drive unit clutch mounted to said drive unit;

an overrunning clutch mounted directly to said rotating shaft; and, a plurality of rotating accessories rotatably connected to said drive unit through said drive unit clutch and rotatably connected to said rotating shaft through said overrunning clutch such that said accessories are driven by said drive unit at a first speed ratio and driven directly by said rotating shaft at a second speed ratio, with said drive unit clutch operating at a predetermined threshold value of an engine operating condition thereby defining the transition between said first and second speed ratios, with said drive unit clutch being initially disengaged at engine start and engages at a predetermined time after engine start.

2. A system according to claim 1 wherein said first speed ratio is greater than said second speed ratio.

3. A system according to claim 2 wherein the ratio of said first speed ratio to said second speed ratio is 2.4:1.

4. A system according to claim 1 wherein said drive unit comprises a coolant pump for pumping coolant through said engine.

5. A system according to claim 1 wherein said drive unit clutch is an electromagnetic clutch.

6. A system according to claim 1 further comprising a controller for causing said drive unit clutch to operate at said predetermined threshold value.

7. A system according to claim 6 wherein said controller receives inputs from a plurality of sensors.

8. A system according to claim 7 wherein said controller calculates said predetermined threshold value based on at least one of a plurality of sensed operating conditions, with said sensed conditions comprising accessory load, engine speed, battery charge, throttle position, engine coolant temperature, vehicle gear selection, vehicle speed, manifold absolute pressure, ambient air temperature, air mass flow rate and accelerator position.

9. A system according to claim 6 wherein said controller causes said drive unit clutch to begin disengaging at said predetermined threshold value until said drive unit clutch is fully disengaged, thereby defining a disengagement period, with said disengagement period being about 3 seconds.

10. A system according to claim 6 wherein said controller causes said drive unit clutch to begin engaging at said predetermined time after engine start until said drive unit clutch is fully engaged, thereby defining an engagement period, with said engagement period being about 3 seconds.

11. A system according to claim 1 wherein said drive unit comprises a water pump.

* * * * *